United States Patent
Ahlers et al.

(10) Patent No.: US 6,741,336 B2
(45) Date of Patent: May 25, 2004

(54) SENSOR FOR AUTHENTICITY IDENTIFICATION OF SIGNETS ON DOCUMENTS

(75) Inventors: Benedikt Ahlers, Berlin (DE); Roland Gutmann, Falkensee (DE); Arnim Franz-Burgholz, Berlin (DE); Anett Bailleu, Berlin (DE); Manfred Paeschke, Basdorf (DE); Peter Halter, Frauenfeld (DE)

(73) Assignees: Bundesruckerai GmbH, Berlin (DE); Bauner Electric, Fraunfeld (DE)

(*) Notice: Subject to any disclaimer, the term of this patent is extended or adjusted under 35 U.S.C. 154(b) by 0 days.

(21) Appl. No.: 09/873,726

(22) Filed: Jun. 4, 2001

(65) Prior Publication Data

US 2002/0003619 A1 Jan. 10, 2002

(30) Foreign Application Priority Data

Jun. 3, 2000 (DE) .......................... 100 27 726

(51) Int. Cl.[7] .............. G06K 9/74; G06K 7/10; H01J 65/08
(52) U.S. Cl. ............... 356/71; 250/271; 250/458.1
(58) Field of Search .................. 356/71; 194/207; 283/92, 72, 85; 250/458.1, 459.1, 461.1, 271, 372; 382/135, 137, 138

(56) References Cited

U.S. PATENT DOCUMENTS

| 4,047,033 A | | 9/1977 | Malmberg et al. | |
|---|---|---|---|---|
| 4,451,521 A | * | 5/1984 | Kaule et al. | 356/71 |
| 4,544,266 A | | 10/1985 | Antes | |
| 5,034,613 A | * | 7/1991 | Denk et al. | 250/458.1 |
| 5,304,813 A | * | 4/1994 | De Man | 356/71 |
| 5,572,367 A | | 11/1996 | Jung et al. | |
| 5,574,790 A | * | 11/1996 | Liang et al. | 283/89 |
| 5,668,363 A | | 9/1997 | Nishida et al. | |
| 5,747,823 A | | 5/1998 | Ishitsuka et al. | |
| 5,867,586 A | * | 2/1999 | Liang | 382/112 |
| 5,915,518 A | * | 6/1999 | Hopwood et al. | 356/71 |
| 5,923,413 A | * | 7/1999 | Laskowski | 356/71 |
| 5,932,139 A | * | 8/1999 | Oshima et al. | 252/301.16 |
| 5,959,296 A | * | 9/1999 | Cyr et al. | 250/271 |
| 5,979,767 A | | 11/1999 | Schonenberg et al. | |
| 5,991,045 A | * | 11/1999 | Lee | 250/226 |
| 6,101,038 A | * | 8/2000 | Hebert et al. | 345/30 |
| 6,172,745 B1 | * | 1/2001 | Voser et al. | 345/71 |
| 6,252,717 B1 | | 6/2001 | Grosskopf | |
| 6,262,423 B1 | * | 7/2001 | Hell et al. | 250/458.1 |
| 6,371,374 B1 | * | 4/2002 | Schwartz et al. | 235/462.01 |
| 2001/0006066 A1 | * | 7/2001 | Cherney et al. | 126/698 |

FOREIGN PATENT DOCUMENTS

| DE | 43 20 177 | 12/1994 |
|---|---|---|
| DE | 195 17 194 | 11/1996 |
| DE | 195 32 877 | 3/1997 |
| DE | 196 51 667 | 9/1997 |
| DE | 198 36 813 | 2/2000 |
| EP | 0 652 529 | 5/1995 |
| EP | 0 762 309 | 3/1997 |
| EP | 0 950 893 | 10/1999 |

* cited by examiner

Primary Examiner—Edward J. Glick
Assistant Examiner—Thomas R Artman
(74) Attorney, Agent, or Firm—Katten Muchin Zavis Rosenman

(57) ABSTRACT

A sensor is proposed for authenticity identification of luminescent identification features on documents, in which the identification feature is illuminated with an excitation wavelength and may respond at a different wavelength, with the response wavelength being detected and evaluated by a radiation receiver. The focused beam emitted from a beam source is converted by focusing optics in such a manner that a scanning line, which is approximately in the form of a bar, is projected on the surface of the document to be investigated, which causes the signet, which is arranged on the document, to fluoresce at least in one subregion, and the fluorescence signal produced in this way is passed via detection objects to an evaluation unit, which evaluates the fluorescence signal.

34 Claims, 5 Drawing Sheets

SENSOR FOR AUTHENTICITY IDENTIFICATION OF SIGNETS ON DOCUMENTS

The invention relates to a sensor for authenticity identification of signets on documents as claimed in the preamble of patent claim 1, and to a signet which interacts with the sensor and has at least one identification feature. Various embodiments of such a sensor have been disclosed. The subject matter of DE 41 17 011 A1 describes an optical sensor in which, in particular, diffuse, low-intensity radiation is intended to be detected, such as that which also occurs when checking currency bills which are provided with luminescent features.

The sensor system described there comprises a conically widening optical fiber rod and further-processing optics, in which case the radiation coming from the measurement object can be detected over a wide spatial angle using the narrow cross-section end of the fiber rod. Owing to the cross-section conversion, the radiation emerges from the fiber rod at a considerably narrower angle, which is matched to the aperture angle of the subsequent optics.

Although it is possible to detect relatively low-intensity luminescent features using this sensor, the strength of the detected luminescent features must not, however, fall below a specific threshold when they are distributed over a relatively large area. It is therefore still relatively insensitive. This is because the use of a conically formed fiber rod results in the disadvantage that detection can take place only in a region in the form of a point on the document, which fails to occur when the element to be investigated (also referred to as the identification feature) is arranged at other points on the document.

Furthermore, excitation using conventional light sources with visible light (for example incandescent lamps) leads to a relatively weak luminescence signal, which must be detected by the fiber rod and must be supplied to the evaluation optics.

The invention is therefore based on the object of developing a sensor for authenticity identification of signets on documents, such that luminescent signets on the document can be identified over a considerably larger area of the document.

In order to achieve said object, the invention is distinguished by the technical teaching of claim 1.

The major feature of the invention is that a focused beam which is emitted by a beam source is converted by focusing optics in such a manner that a scanning line, which is roughly in the form of a line, is produced on the surface of the document to be investigated and causes the identification feature, which is arranged on the document, to fluoresce, and the fluorescence signal is evaluated via detection optics by an evaluation unit.

In order to delineate the individual terms from one another, the term "identification feature" is used generally as a feature which verifies the authenticity of a document, which can be applied directly to the document itself, but which can also be arranged in the region of a signet.

The term "signet" describes a mark or a label, a seal, a delineated area of any type or a printed region on a document which is connected (for example by being bonded on) detachably or non-detachably to the document, on which the identification feature is arranged. The later description does not define whether the identification feature is located directly on the document itself or is part of a signet applied to the document and which is connected detachably or non-detachably to the document.

The given technical teaching results in the major advantage that the production of a scanning line, which is approximately in the form of a bar, on the document to be investigated for the first time makes it possible to investigate not only areas in the form of points on the document, but an entire area in the form of a line, which is converted into a corresponding investigation area when the document is moved past the measurement window at a specific speed approximately at right angles to the longitudinal axis of the scanning line.

It is thus now for the first time possible to investigate a document which is moving past the measurement window over a large area for the presence of authenticity features, while the document is being moved past the measurement window of the sensor and, in the process, the scanning line, which is projected on the document surface, scans a relatively large area of the document. The authenticity feature or signet to be investigated can thus be arranged such that it is distributed over a large area of the document. The scanning beam is chosen to be sufficiently long that the signet is reliably arranged in the region of the scanning beam of the document.

It is preferable for the so-called up-conversion effect to be used. In this case, the excitation wavelength is longer than the wavelength emitted from the authenticity feature. Expressed in the frequency domain, this means that the excitation frequency is lower than the response frequency.

However, the invention also relates to other excitation mechanisms, such as the use of the "normal" fluorescence effect, in which the excitation takes place at a specific wavelength and the fluorescent authenticity feature responds at a longer wavelength, which represents the opposite effect to said up-conversion effect.

A third embodiment relates to the fluorescence effect in which the excitation is at the same wavelength as the emission wavelength, but with the response pulse following the excitation pulse with a defined time delay.

All said effects are the subject matter of the present invention, and the protection area of the invention extends to the use of all said effects, also when combined with one another.

The further features of the invention are evident from the following summary, based on key words:

Features of the Sensor System

1. The sensor according to the invention is suitable for mounting in a (high-speed) transport apparatus, and may also be in the form of a scanner.
2. It is suitable for detection of a security feature, predominantly on flat objects.
3. A signet, comprising a color with added up-conversion pigments, is proposed by preference as the detectable security feature. If need be, these pigments can also be added directly in an applied solution, an applied paint, the adhesive or the paper.
4. The sensor is advantageously suitable for detection of a (for example printed-on) security feature with small dimensions (for example 5×5 mm). If the security feature is applied by printing, the printing can be applied within relatively wide limits. The required sensor measurement range must therefore cover the entire possible printed area, although the signet printed on it may appear anywhere in this printing area, and the signet may be several times smaller than the printing area.
5. The measurement area (scanning area, transversely with respect to the transport direction) may, for example, have a size of up to 70 mm, and the small security feature is detected anywhere within this large measurement area.

6. Position-resolved detection is preferably carried out in the transport direction, but position resolution in the direction transversely with respect to the transport direction is only optional.
7. The speed in the transport direction varies from zero to 4 m/s.
8. An embodiment in the form of a two-band sensor is also preferred, in which the test object is illuminated once, and in which two different spectral bands are evaluated. In this case, the received beams are split by means of a beam splitter, are each optically filtered separately, with different pass band wavelengths, and are evaluated in separate receivers. A dichroic mirror is particularly suitable for use as a beam splitter. Alternatively, a spectral measurement could be carried out, in which the presence of one, two or more spectral components and their spectral appearance as well as their intensity would be monitored.
9. An integrated UV luminescence sensor can be used as an embodiment, in which the test object is illuminated with UV light (for example with UV LED at a wavelength of 370 nm or using a discharge lamp), and the luminescence signal is detected in a different spectral band. Specifically adapted optical filters are required for this purpose.
10. An integrated or external object detector (optical barrier) can be used as an additional feature, which indicates to the sensor when the object (signet) starts and when it ends.
11. If a synchronization input is used, which is fed with a switching signal proportional to speed, it is also possible to investigate a certain predetermined subsection of the test object on its own in the event of speed variations, or the measurement signals, position-resolved in the transport direction, can be synchronized to this synchronization signal.
12. Pigments with a rapid rise and a rapid fall time (for example typically 0.1 m/s) are advantageously used, in order to allow detection at the desired high speeds. The electronic evaluation is, of course, matched to the characteristic times of the pigments.
13. Shadowing of external light by means of mechanical apparatuses is also advantageous.

Features of the Illumination Optics (Laser Optics)
1. A laser wavelength of 980±10 nm is preferable, and a wavelength of 850±20 nm can also be used in another embodiment. However, LEDs or other light sources can also be used.
2. The laser line according to the invention is produced by focusing using a commercially available cylindrical lens or by focusing using a normal lens and subsequent divergence using a cylindrical lens. This results in the production of a laser line whose illumination intensity is typically at its highest in the center of the scanning line. This is due both to the imaging quality of the cylindrical lens and to the emission characteristic of the laser diode.
3. The laser line is preferably produced jointly using a normal lens and using an aspheric cylindrical lens or, alternatively, jointly using a cylindrical lens array or, in another alternative, jointly using a sinusoidal lens surface; these optics make it possible for the illumination intensity to be distributed to a certain extent homogeneously over the entire length of the laser line, or to be slightly raised at the edge (or likewise in the center), in order to compensate for the sensitivity variation of the receiver over the measurement range.
4. Alternatively, the "laser line" can be simulated by a number of individual beams, which are relatively close to one another, in order to identify the small, marked signets.
5. When using a number of individual beams to simulate the laser line, the beams can be focused in the object plane such that they are slightly defocused, in order to achieve an optimum illumination intensity for the pigments. The "luminescence efficiency" varies with the illumination intensity and is generally at an optimum at an illumination intensity which is high, but not too high. If the illumination intensity is too high, the signal level of the received light may fall again.
6. The temperature of the laser diode may be stabilized in order to stabilize its wavelength, since the fluorescence efficiency of up-conversion pigments is highly wavelength dependent.

Features of the Evaluation
1. The wavelengths which are not desired in the receiver are filtered optically. In the main embodiment in particular, the actual laser light is filtered out and is suppressed. This suppression is preferably chosen to be very intense, for example $<10^{-7}$. In addition, any incident daylight is suppressed as strongly as possible. An interference bandpass filter with a pass band of 20 to 100 nm is preferably used and, additionally or if need be, short- and long-pass filters with suitable cutoff wavelengths instead of this filter.
2. In order to suppress the external light, the laser light is preferably pulsed, and the received signal is filtered using an electronic high-pass filter.
3. In order to further increase the identification confidence, the security feature must be identified during at least two, or possibly a greater number, of periods, otherwise it is rejected as being inadequate.
4. The interference immunity to external light and electronic injected interference is further improved by a conventional embodiment or—as will be described in the following text—by a specific embodiment of synchronous gain. In order to achieve synchronous gain, the evaluation is carried out via an analog circuit having sample-and-hold elements. The synchronous gain evaluates only light signals which are received in phase with the pulse repetition frequency of the transmitted laser light. Furthermore, the signal evaluation may include other details, such as sampling of the signal once 10% of the pulse duration has elapsed, and comparison of this signal with the signal once 60–95% of the pulse duration has elapsed. The signal level of the comparison signal must now be greater by a certain amount than the value sampled first of all. To do this, the chosen time windows, in this case 10% and 60–90%, must be matched to the bandpass frequency of the electronics and, in particular, to the rise and fall times of the pigments. A microprocessor is advantageously used to monitor these signals and time signals. The same principle can be used in the pulse pause for the fall in the signal. This specific embodiment of synchronous gain at the same time allows a certain amount of electronic suppression of the exciting laser light, if this has not already been completely suppressed by the optical filters.
5. Alternatively, the evaluation can be carried out using a microprocessor with an integrated or external A/D converter. The same evaluation principle can be used in this case.
6. In an alternative embodiment to the invention described above, it is proposed that a number of lenses be used, instead of a single lens, which are stacked one above the other (or in a row behind the measurement window). The light from each lens is then passed through a respective reflection cone and falls onto a respective receiver. The signals can be evaluated individually, in pairs or jointly. A total may also be formed, with this signal then being evaluated.

7. Another preferred embodiment proposes coaxial optics. In this embodiment, the transmitted and receiving beams are joined together via a beam splitter, which may also be dichroic, and leave the sensor housing together. This beam splitter is advantageously installed between the optics head and the measurement window. In this embodiment the sensitivity variation with the distance in front of the sensor is less.

A further preferred embodiment relates to the arrangement of a stack of lenses with a short focal length and a wide aperture, each having one receiving element. The various lenses each image a portion of the laser line on the associated receiving element. In order to gather a large amount of light, an imaging scale of 1:1 is preferable, together with a focal length of 10–20 mm. The distance between the lens and the object is then quite short, and this reduces the influence of scattered light.

The subject matter of the present invention results not only from the subject matter of the individual patent claims but also from the combination of the individual patent claims with one another. All the statements and features disclosed in the documents—including the abstract—and in particular the physical embodiment illustrated in the drawings are claimed as being significant to the invention where they are novel individually or in combination in comparison to the prior art.

The invention will be explained in more detail in the following text with reference to drawings, which illustrate only one embodiment approach. In this case, further features and advantages of the invention which are significant to the invention are evident from the drawings and from their description. In the figures.

For the sake of simplicity, it is assumed in the following description that a laser is used as the beam light source. However, the invention is not limited to this, and one or more LEDs, or the other light sources mentioned in the general part, may also be used as a beam light source instead of a laser.

If a laser is used, the laser wavelength mentioned in the general part of the description is preferred.

The use of a laser generally has the advantage that the scanning line is imaged with a relatively high radiation intensity on the surface of the document, which is not true to the same extent when using other beam sources.

The illumination intensity is then correspondingly lower when using other beam sources, in particular LEDs. However, this may be sufficient for some applications.

Figure 1:
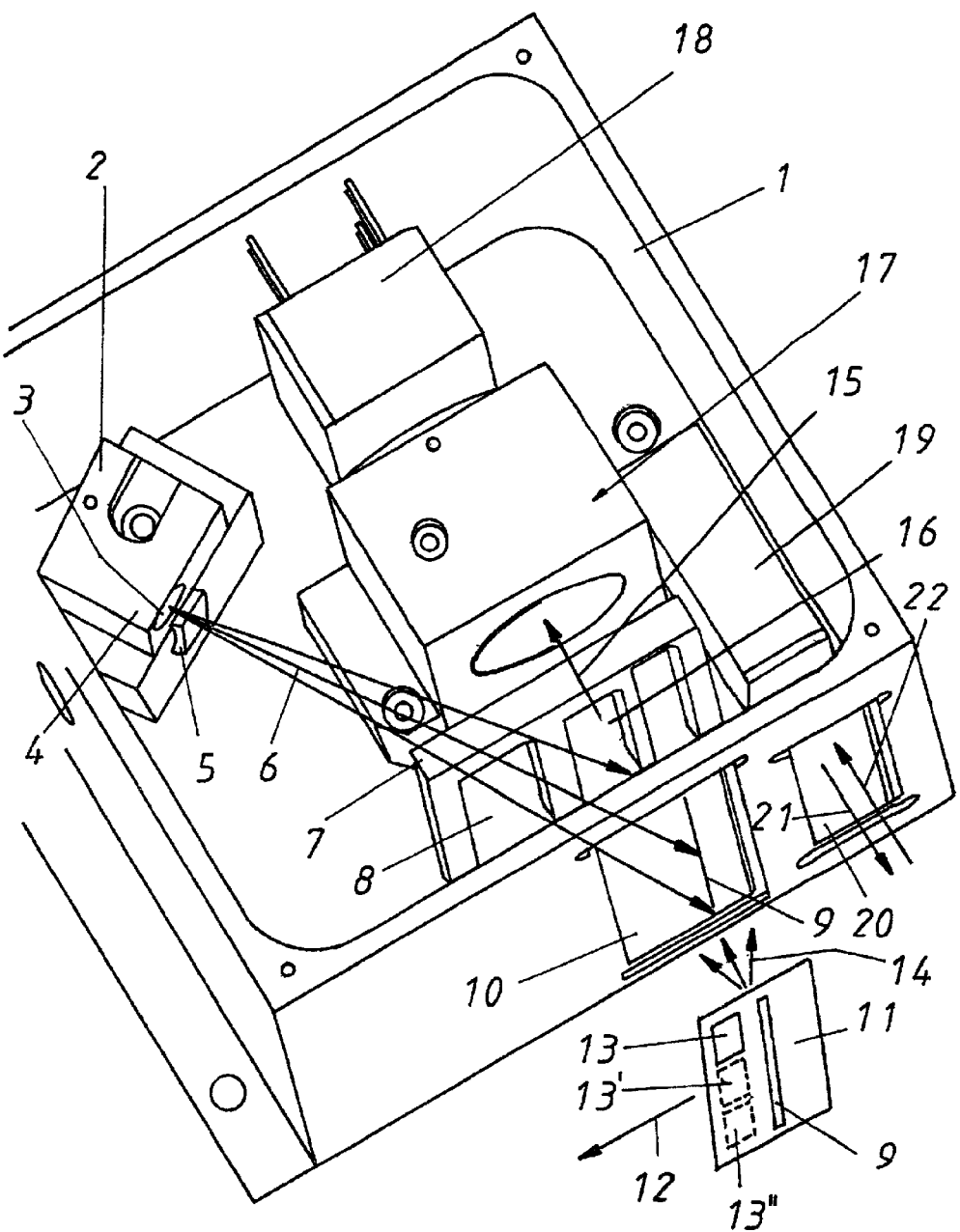
FIG. 1 shows, schematically, a plan view of the measurement sensor according to the invention.

In FIG. 1, in general, a laser 2 is accommodated in a further housing in an outer housing 1, with a focusing lens 4 being arranged (see also FIG. 2) in a manner which is not illustrated in any greater detail in the interior of the inner housing, and a cylindrical lens 5, which causes the focused beam 6 to diverge appropriately, being arranged in front of the beam opening 3, such that said beam is emitted in the direction shown by the arrow onto the measurement window 10, forming a scanning line 9 approximately in the form of a bar.

The measurement window 10 is in this case assumed to be closed by a glass pane. The document 11 to be investigated is moved in the direction of the arrow 12 past the front of the measurement window, and virtually touching the glass pane, with an authenticity feature 13 being arranged in a specific area on the document. The important factor is that the authenticity feature 13 can now be arranged at different points, for example even at the points 13' or 13". This is where the invention is effective, providing for the length of the scanning line 9 to be at least as large as the outermost authenticity feature 13, 13', 13" to be expected on the document, so that the length of the scanning line 9 always ensures that it detects an authenticity feature 13 even if this is arranged at an unexpected point on the document 11.

For completeness, it should also be mentioned that the focused beam 6 passes through a window 8 in the region of an aperture 7, which has a number of windows.

The authenticity signet (authenticity feature 13) operates on the basis of one of the abovementioned effects and, once it has been excited by the laser light in the scanning line 9, passes back a reflected beam 14, in the directions of the arrows shown, through the measurement window 10, passing through the window 16 in the direction of the arrow 15.

The beam in the direction of the arrow 15 is further processed in an optics head 17 and is finally supplied to an evaluation unit 18. This evaluation unit preferably consists of a photo multiplier (photo-intensification tube).

Other evaluation units can also be used instead of a photo multiplier, such as a matrix camera which operates using a CCD chip or a CMOS chip, possibly supplemented by an upstream residual light intensifier.

For the sake of clarity in the illustration in FIG. 1, the document 11 is at a certain distance from the measurement window 10. In reality, this distance is very small, and the document 11 is intended to moved past the measurement window 10, a few millimeters in front of it, in the direction of the arrow 12.

Optionally, a so-called document sensor 19 may also be provided in the housing 1, and is preferably in the form of a light barrier. In this case, a measurement beam 21 is passed to the document to be investigated and is reflected back as a reflected beam from this document in the direction of the arrow 22, and is passed back through the window 20.

This confirms whether any document at all is or is not present. The laser optics are enabled only after this has been done, producing the abovementioned scanning line 9 on the document surface 11 to be investigated.

In addition, the authenticity feature is evaluated only in the time in which the document sensor 19 detects the presence of any document.

Figure 2:
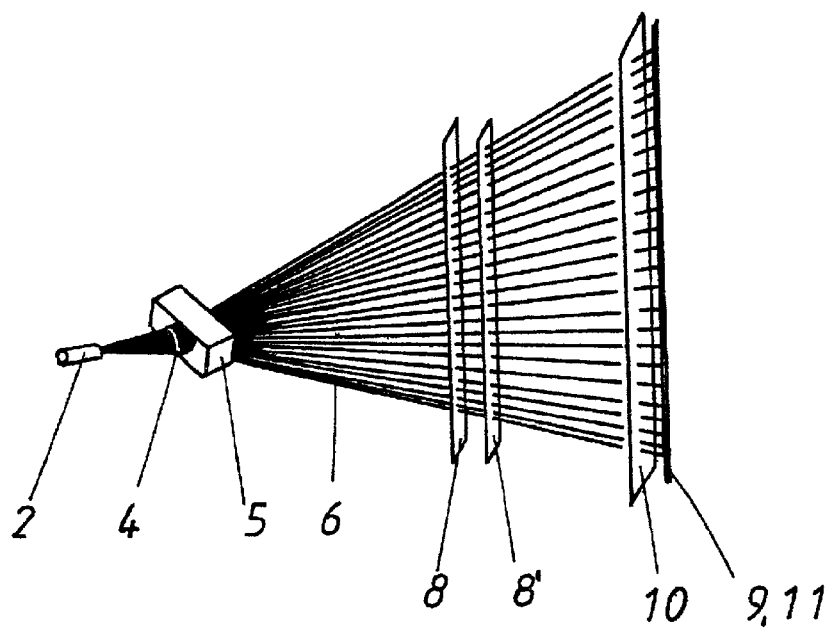
FIG. 2 shows, schematically, an illustration of the focused beam emitted from the radiation source.

FIG. 2 shows, in more detail, the formation of the focused beam 6 produced by the laser 2. It can be seen here that the beam produced by the laser 2 passes through a focusing lens 4, after which it is then caused to diverge in the form of a bar by a downstream cylindrical lens 5. After this, it is bounded by one or more apertures 8, 8' located one behind the other, in such a manner that, in the region of the measurement window 10, it produces the abovementioned scanning line 9, in the form of a bar, on a document 11 located behind this window.

If a laser 2 is used, the scanning line has a width of about 0.1–0.5 mm and a length of 70 mm.

In this case, the wavelength is preferably in the infrared band.

Figure 3:
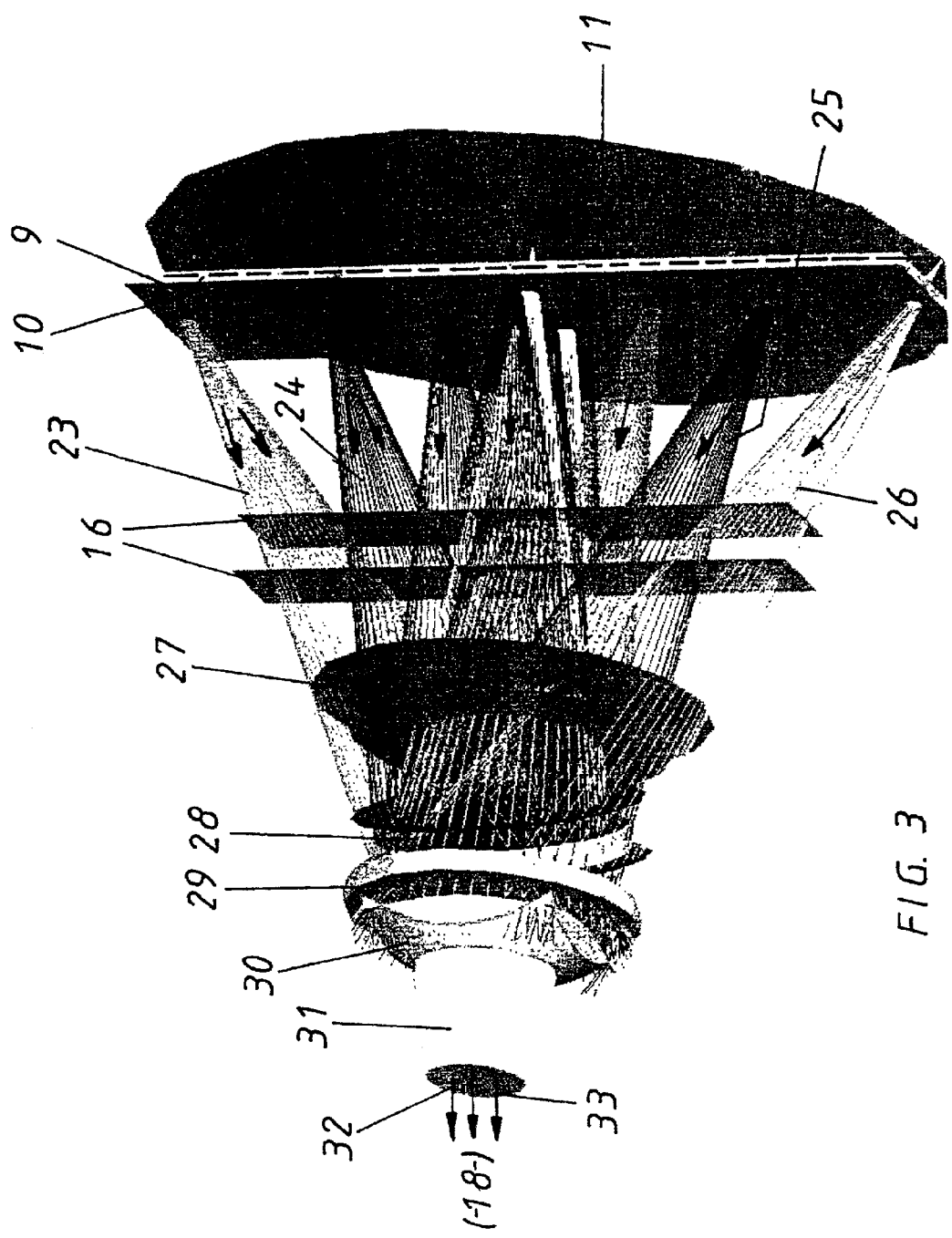
FIG. 3 shows, schematically, an illustration of the various focused beams which are emitted from the authenticity feature toward the evaluation objects, and are received.

FIG. 3 shows the evaluation of the light reflected from the authenticity feature. For its part, each point on the scanning line 9 which is excited by laser light produces a focused beam. Some of these focused beams are shown by way of example in FIG. 3, specifically the focused beams 23–26. These are bounded by two interleaved aperture windows 16. When appropriately excited by the laser scanning line, the outer focused beams 23, 26 are the maximum possible focused beams which can be produced.

After passing through one or more aperture windows 16, all the focused beams pass through a first aperture 27, which has an approximately round profile and bounds the beam form. After this, the focused beam passes through a filter 28, which selects the wavelength to be passed. In the described exemplary embodiment, only the 550 nm wavelength is intended to be passed.

After this, the focused beam passes through a second filter 29, which absorbs further ambient light in order to prevent this from falling on the evaluation unit. After this, the light passes through a receiving lens 30, which is in the form of a convergent lens and focuses the entire focused beam onto a reflection cone 31. This reflection cone is a metallically coated hollow body which tapers like a funnel from the beam inlet and has internally reflective surfaces. This not only ensures that those beams which are imaged directly on the receiving element pass through the reflection cone 31, but also that those beams which strike the inner surfaces of the reflection cone 31 obliquely, are reflected there and are combined with the direct main beam are imaged on the receiving element.

The reflection cone thus significantly intensifies the received light beam, since not only the direct beams but also side beams which strike the inner walls of the reflection cone 31 obliquely are used for evaluation. For a given field of view, the reflection cone allows, in particular, the optics to have a focal length and a larger aperture than would be possible without the cone.

These relationships apply to the geometric illustration in FIG. 3, in which the signet has a relatively large area and emits a large number of focused beams 23, 26, with a large number of focused beams (for example the beams 23 and 26) being located at the edge.

If, in contrast, the signet has a small area, that is to say it has a considerably smaller area than that shown in FIG. 3, then use of the features described in the following text results in further advantages in terms of the evaluation capability.

If it is assumed that a small-area signet is arranged only in the region of the focused beams 25–26 on the document 11, then it is possible to achieve sufficient evaluation accuracy using just the focused beam 25, 26 at the edge. This is because this focused beam is reflected obliquely owing to the reflective inner sides of the reflection cone 31 is added to the main beam, is thus intensified, and leaves the outlet surface 32 as an outlet focused beam 33 in the direction of the arrow.

It has already been mentioned above that different elements can be used for the evaluation unit 18; the following description is based on the assumption of a photo multiplier. This is an approximately round element which has an 8 mm active zone, is arranged directly in physical contact with the outlet surface 32 of the reflection cone 31, and whose dimensions correspond approximately to the dimensions of the outlet surface 32.

Figure 4:
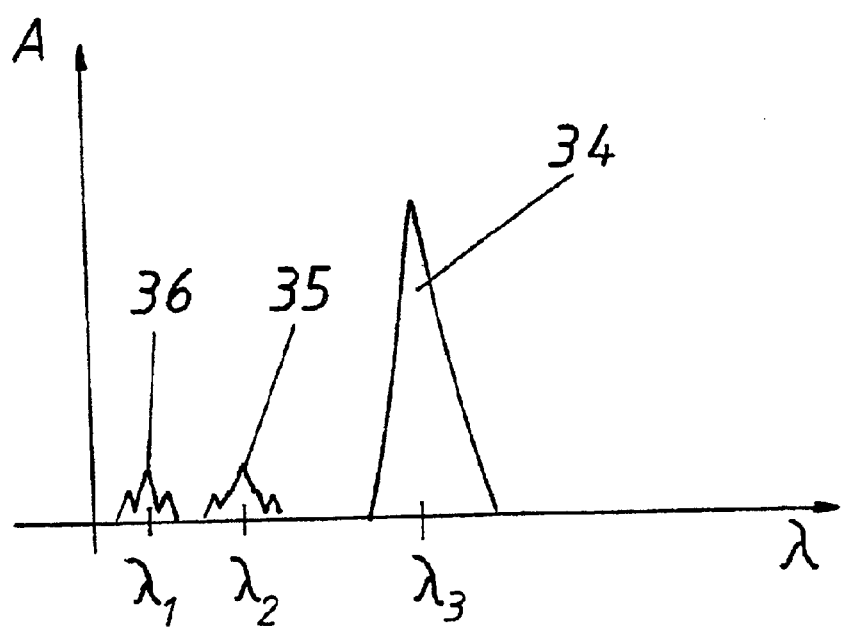
FIG. 4 shows a diagram of the laser excitation and its response.

FIG. 4 illustrates, once again graphically and in general form, one possible excitation mechanism according to the invention. In this case, the amplitude of the beam is plotted on the ordinate in the coordinate system, and the wavelength is plotted on the abscissa. It is assumed that the laser excitation 34 takes place at a specific wavelength $\lambda_1$, and that the authenticity feature 13 then responds with corresponding up-conversion luminescence 35 at a shorter wavelength $\lambda_2$. This up-conversion luminescence 35 is detected and evaluated by the evaluation unit 18.

In addition to single up-conversion luminescence in the wavelength band $\lambda_2$, it is normally possible for even further up-conversion luminescences to be produced, for example at the wavelength $\lambda_3$, at reference number 36. If appropriate, these can also be detected by the evaluation unit 18.

One advantage of the described sensor is that a very high transport speed can be used, from zero speed up to 4 m per second, so that fluorescent authenticity features 13 on appropriate documents 11 can thus be evaluated very quickly.

A further advantage is that the entire arrangement is relatively insensitive to scattered light, since excitation takes place using a high light intensity and, in a corresponding manner, a relatively high light-intensity reflected beam 14 is also produced, which is insensitive to scattered light.

Figure 5:
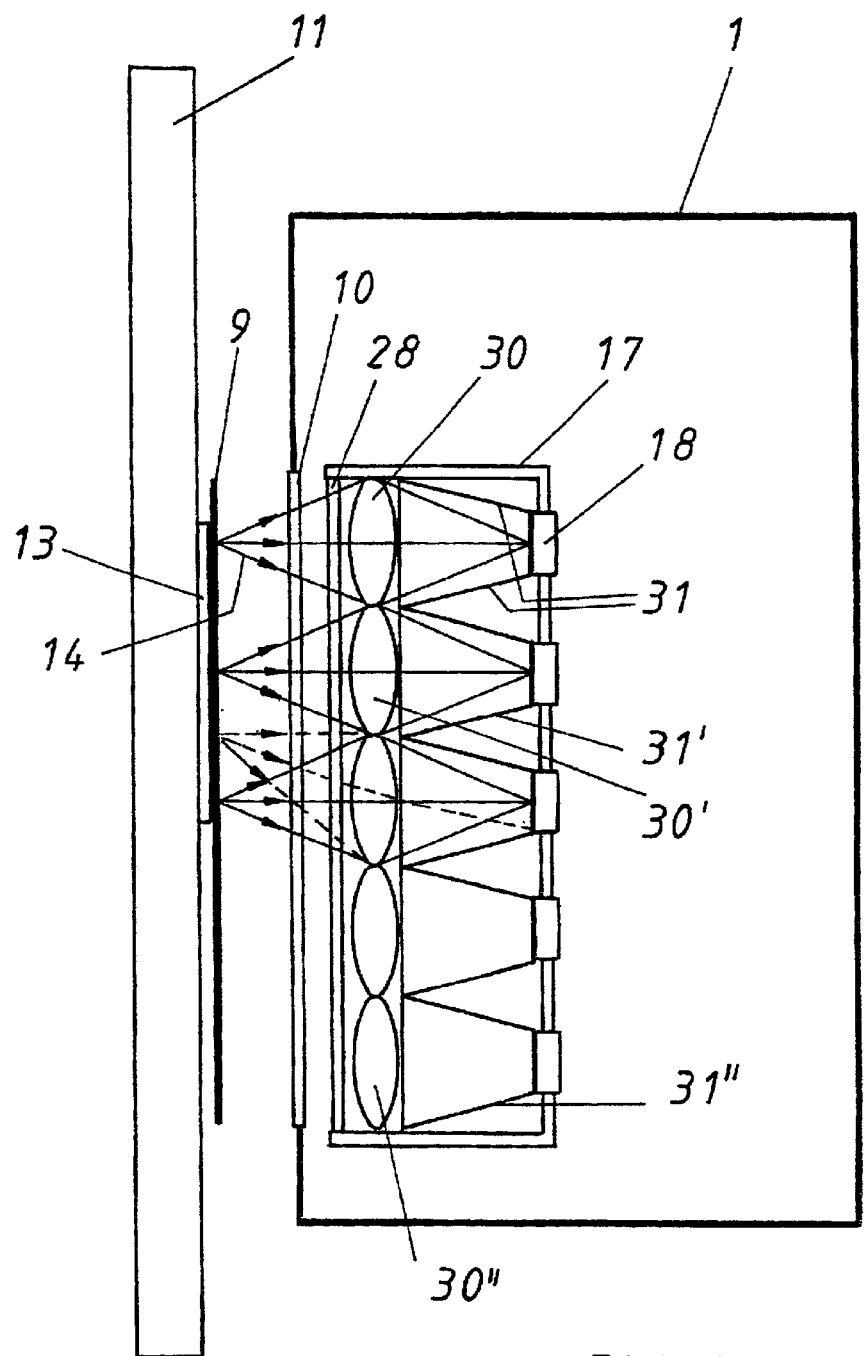
FIG. 5 shows a further embodiment of a sensor, illustrating a side view of the receiver head.

In FIG. 5, the same parts mentioned above are provided with the same reference symbols. This shows a stack of receiving lenses 30, 30" which are arranged in a row one behind the other, and with each receiving lens imaging a portion of the scanning line 9.

The light from each lens 30, 30" is then passed through a respective reflection cone 31 and falls onto a respective receiver 18. The signals can be evaluated individually, in pairs or jointly. A total may also be formed, which signal is then evaluated.

Drawing legend

1 Housing
2 Laser
3 Beam opening
4 Focusing lens
5 Cylindrical lens
6 Focused beam
7 Aperture
8 Window 8'
  Scanning line
10 Measurement window
11 Document
12 Arrow direction
13 Authenticity feature 13', 13"
14 Reflection beam
15 Arrow direction
16 Aperture window
17 Optics head
18 Elevation unit
19 Document sensor (light barrier)
20 Window
21 Measurement beam
22 Reflection beam
23 Focused beam
24 Focused beam
25 Focused beam
26 Focused beam
27 Aperture
28 Filter
29 Filter
30 Receiving lens
31 Reflection cone
32 Outlet surface
33 Outlet focused beam
34 Laser excitation
35 Up-conversion luminescence
36 Up-conversion luminescence

What is claimed is:

1. A sensor for authenticity identification of luminescent signets on documents comprising:

a signet that is illuminated as a fluorescent authenticity feature, with a specific excitation wavelength and may respond at a different wavelength, with a response wavelength being detected and evaluated by a radiation receiver, wherein a focused beam, which is emitted from a beam source, is converted by a focusing optics in such a manner that a scanning line, which is approximately in the form of a bar, is projected on a surface of a document to be investigated, which causes the signet, which is arranged on the document, to fluoresce at least in one subregion and a fluorescence signal produced in this way is emitted from the authenticity feature and passed via detection optics to an evaluation unit, which evaluates the fluorescence signal;

wherein the fluorescent authenticity feature is illuminated at the excitation wavelength with an excitation pulse and a response pulse following the excitation pulse is detected with a defined time delay, wherein in order to identify the signet on the document, the signet is equipped, at least in subregions, with a pigment which can be detected using an up-conversion effect, and the sensor is adapted to use the up-conversion effect, wherein the specific excitation wavelength is longer than the response wavelength, wherein the sensor is adapted for authenticity identification of luminescent signets on documents transported in a transport direction relatively to the scanning line at high speed, and wherein the high speed in the transport direction varies and takes any non-zero value in the interval from 0 to 4 m/s.

2. The sensor as claimed in claim 1, wherein the document is moved relative to the measurement window approximately at right angles to the longitudinal axis of the scanning line.

3. The sensor as claimed in claim 1, wherein the emission wavelength of the authenticity feature is at the same wavelength as the excitation wave, and wherein the pulse response follows the excitation pulse with a time delay.

4. The sensor as claimed in claim 3, wherein the external light is suppressed by evaluation only those pulsed florescent signals which are received with the pulse recitation frequency of the pulsed illuminate.

5. The sensor as claimed in claim 1, wherein the pigments are added directly to an applied solution, to an applied paint, to the adhesive or to the document.

6. The sensor as claimed in claim 5, wherein the external light is further suppressed by filtering the received signal by means of an electronic high-pass filter.

7. The sensor as claimed in claim 1, wherein position-resolved detection is carried out in the transport direction.

8. The sensor as claimed in claim 7, wherein the sensor is formed as a two-band sensor, in which the fluorescent authenticity feature is illuminated once and in which two different spectral bands are evaluated.

9. The sensor as claimed in claim 8, wherein an additional sensor is integrated in the form of a UV luminescence sensor, in which the fluorescent authenticity feature is illuminated with UV light of a different wavelength and wherein the luminescence signal is detected in a further different spectral band.

10. The sensor as claimed in claim 9, wherein an additional object detector is used, which indicates to the sensor when the signet starts and when it ends.

11. The sensor as claimed in claim 10, wherein in order to identify the signet on a document, the signet is equipped, at least in subregions, with a pigment having a fast rise time and a fast decay time in order of magnitude of 0.1 ms and the response pulse following the excitation pulse is detected with a defined time delay in the order of magnitude of 0.1 ms.

12. The sensor as claimed in claim 10, wherein the signet detector is formed as an optical barrier.

13. The sensor as claimed in claim 9, wherein the UV light is emitted from an UV-LED at a wavelength of 370 nm.

14. The sensor as claimed in claim 7, wherein the identification confidence of the authenticity identification is increased by identifying the fluorescent authenticity feature during two or more periods of a sequence of pulses.

15. The sensor as claimed in claim 7, wherein the signal is evaluated by sampling of the signal once a first time window of the response pulse duration has elapsed and sampling of the signal once a second time window of the response pulse duration has elapsed wherein the sampled signal of the second time window is compared to the sampled signal of the first time window.

16. The sensor as claimed in claim 1, wherein a laser wavelength of 980±10 nm is used for excitation.

17. The sensor as claimed in claim 1, wherein a laser wavelength of 850±10 nm is used for excitation.

18. The sensor as claimed in claim 1, wherein the laser line produced using cylindrical lenses has an illumination intensity whose maximum occurs at the center of the line.

19. The sensor as claimed in claim 1, wherein the laser line is produced using an aspherical cylindrical lens.

20. The sensor as claimed in claim 1, wherein the laser line is produced using a sinusoidal lens surface.

21. The sensor as claimed in claim 1, wherein, in order to compensate for the sensitivity variation of the receiver, the illumination intensity of the laser line is increased slightly at the edge of the laser line.

22. The sensor as claimed in one of claim 21, wherein a reflection cone is arranged in front of the electronic evaluation unit for beam intensification which is in the form of a funnel-shaped or cylindrical transparent solid body.

23. The sensor as claimed in claim 22, wherein a photomultiplier having a detection surface corresponding approximately to the outlet surface of the reflection cone is arranged immediately behind the reflection cone.

24. The sensor as claimed in claim 22 wherein the reflection cone is a combination of cylindrical lens and the funnel shaped transparent solid body.

25. The sensor as claimed in claim 1, wherein only a portion of the scanning line is in each case imaged on the receiver via a respective lens, with these different imaged parts of the scanning line overlapping one another.

26. The sensor as claimed in claim 25, wherein the lenses are arranged as a stack, resting closely against one another, at a window (8, 8') of a sensor housing.

27. The sensor as claimed in claim 25 or 26, wherein the light from each lens is passed through a respective reflection cone and falls on a respective receiver.

28. The sensor as claimed in claim 1, wherein the transmitting and receiving beams are joined together via a dichroic beam splitter, and leave a sensor housing together.

29. The sensor as claimed in claim 1, wherein the high speed in the transfer direction varies up to 4 m/s.

30. The sensor as claimed in claim 1, wherein the high speed in the transport direction varies from 1.5 m/s to 4 m/s.

31. The sensor as claimed is claim 1, wherein the high speed in the transport direction is approximately 4 m/s.

32. The sensor as claimed in claim 1, wherein the sensor is adapted for detection of a signet having a dimension smaller than the size of the scanning line, such that the signet is detected anywhere within the scanning line.

33. The sensor as claimed in claim 32, wherein the dimension of the signet is approximately 5×5 mm.

34. The sensor as claimed in claim 32, wherein the scanning line has a size of up to 70 mm.

* * * * *